United States Patent
Skog et al.

(10) Patent No.: US 7,509,496 B2
(45) Date of Patent: Mar. 24, 2009

(54) DEVICE-TYPE AUTHENTICATION IN COMMUNICATION SYSTEMS

(75) Inventors: Robert Skog, Hässelby (SE); Peter Stark, Tygelsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 885 days.

(21) Appl. No.: 10/779,862

(22) Filed: Feb. 18, 2004

(65) Prior Publication Data

US 2005/0108539 A1      May 19, 2005

(30) Foreign Application Priority Data

Feb. 28, 2003    (EP)    ................... 03075617

(51) Int. Cl.
G06F 7/04        (2006.01)
G06F 15/163      (2006.01)
G06F 17/30       (2006.01)
H04L 9/00        (2006.01)

(52) U.S. Cl. ............ 713/170; 713/155; 713/160; 713/179; 713/176; 713/181; 713/168; 726/7; 726/29; 705/56

(58) Field of Classification Search ............ 713/155, 713/160, 170, 179, 176, 181, 168; 726/7, 726/29; 705/56
See application file for complete search history.

(56) References Cited

U.S. PATENT DOCUMENTS

| | | | | |
|---|---|---|---|---|
| 5,740,361 A * | 4/1998 | Brown | ................ | 726/5 |
| 5,841,970 A * | 11/1998 | Tabuki | ................ | 726/2 |
| 6,487,667 B1 * | 11/2002 | Brown | ................ | 726/7 |
| 6,510,236 B1 * | 1/2003 | Crane et al. | ................ | 382/116 |
| 6,799,197 B1 * | 9/2004 | Shetty et al. | ................ | 709/203 |
| 2003/0014496 A1 | 1/2003 | Spencer et al. | | |
| 2003/0097564 A1 * | 5/2003 | Tewari et al. | ................ | 713/171 |
| 2004/0054779 A1 * | 3/2004 | Takeshima et al. | ................ | 709/225 |
| 2006/0150257 A1 * | 7/2006 | Leung et al. | ................ | 726/27 |

FOREIGN PATENT DOCUMENTS

| | | |
|---|---|---|
| EP | 1 191 422 A2 | 3/2002 |
| WO | 03/003173 A1 | 1/2003 |

OTHER PUBLICATIONS

Suryanarayana, Lalitha et al. "Profiles for the Situated Web", ACM 2002.*
Franks, J. et al. "HTTP Authentication: Basic and Digest Access Authentication" (RFC 2617), Jun. 1999.*

(Continued)

*Primary Examiner*—Kambiz Zand
*Assistant Examiner*—Michael J Simitoski
(74) *Attorney, Agent, or Firm*—Nixon & Vanderhye P.C.

(57) ABSTRACT

In a communication system (1), a header comprising information, preferably being related with a device-type associated commitment, is additionally provided with a signature for that information. The signature guarantees the authenticity of the header information. The signature is tamper-resistantly created in a first device (20), preferably based on at least tamper-resistant device-type specific information of the first device (20). The header information and the signature are communicated to a content provider (10), where the signature is verified before accepting the device-type associated commitment to be valid. Such signatures can preferably be used in systems using HTTP or SMTP.

15 Claims, 4 Drawing Sheets

OTHER PUBLICATIONS

Stallings, William. Network Security Essentials, Applications and Standards. 1999, Prentice-Hall, Inc., pp. 161-183, 206-223.*

Ohto, Hidetaka et al. "CC/PP exchange protocol based on HTTP Extension Framework", Jun. 1999.*

OMA. "Digital Rights Management Version 1.0, Proposed Version", Jun. 2002.*

OMA. "Download Architecture Version 1.0, Proposed Version", Jun. 2002.*

OMA. "Generic Content Download Over The Air Specification Version 1.0, Proposed Version", Jun. 2002.*

Wireless Application Protocol Forum. "Wireless Application Group User Agent Profile Specification", Nov. 1999.*

* cited by examiner

DEVICE-TYPE AUTHENTICATION IN COMMUNICATION SYSTEMS

This application claims priority to EP Patent Application 03075617.5 filed 28 Feb. 2003. The entire contents of these applications are incorporated herein by reference.

TECHNICAL FIELD

The present invention relates in general to data transfer in communication systems and in particular to handling of computer code or media objects.

BACKGROUND

There is a growing market for supplying different types of computer codes or media products by transferring data over a communication network. Typical examples are downloading of e.g. music recordings, computer code, images, video sequences or literal creations. Most such data entities are related to some kind of copyrights. However, the fast development in computer network technology has opened up for unauthorized distribution and copying.

In this technical field, there is a need for content providers and operators to control the usage of downloaded media objects. Download is the means by which a media object is delivered to the device where it is going to be utilized. In order to provide such a protection, different Digital Rights Management (DRM) concepts have been developed. DRM is thus the means to control the usage of the media object once it has been downloaded.

An association of different actors in this field has cooperated within an organization Open Mobile Alliance (OMA) to provide different DRM solutions. The presently available DRM specifications are, however, not fully secured when it comes to protecting the content. Today, the usage of DRM is targeted to devices that are closed, in that sense that it is not possible to change any of the programs in the terminal, e.g. a phone. An example of such a closed phone is the SONY ERICSSON T68i. Such a device should then be suitable for handling DRM (even if the present release doesn't).

The protection of the content is in such cases guaranteed by the hardware or software of that particular type of device. If the receiving device states that it is a particular device, having a device software or supporting different DRM-associated applications, the receiving party commits itself to follow certain rules. Such statements are therefore related to some type of device-type associated commitment.

Before a media object content with DRM is sent to a receiving party, the content provider will receive information about the capability of the receiving terminal. This is typically performed using e.g. HTTP ("HypeiText Transfer Protocol") headers such as Accept, User Agent or UAProf. The content provider uses this information to prevent sending content to terminals that does not guarantee to follow DRM guidelines.

In the published US patent application 2003/0014496 A1, a closed-loop delivery system for digital media is disclosed. Device-identifying information is provided to a content server. The content server controls or authenticates the device-identifying information against databases comprising information about devices, users and usage rights. If the particular device and its user have usage rights and appropriate functional capabilities, media content is returned. The authentication is made on the identifying information based on data stored and available only at the content provider side. This is thus a typical example of the state-of-the-art described above.

SUMMARY

A problem with prior art devices is, however, that it is easy for any terminal to signal that it supports DRM, even if it doesn't. It just has to send the capabilities according to the DRM specification or to give false device-identifying information. In prior art systems, the content provider cannot know by certain that what is claimed by the device is really true. This means that there might be occasions where the content provider sends valuable content to terminals that, without the content provider knowing it, will not inflict DRM rules. These terminals can then easily break the DRM protection and do what they want with the content.

A general object of the present invention is thus to provide device-type authentication in a communication system. A further object of the present invention is to provide such methods and devices avoiding extensive signaling efforts.

The above objects are achieved by methods and devices according to the enclosed patent claims. In general words, a header comprising information, preferably being related with a device-type associated commitment, is additionally provided with a signature for that information. The signature guarantees the authenticity of the header information. The signature is tamper-resistantly created in a receiving device preferably based on at least tamper-resistant device-type specific information of that device. The header information and the signature are communicated to a content provider, where the signature is verified before accepting the device-type associated commitment to be valid. Such signatures can preferably be used in systems using HTTP or SMTP ("Simple Mail Transfer Protocol").

In one example embodiment, the actual verification of the signature is performed in a separate device in the communication system, e.g. a device being related to the manufacturer of the receiving terminal.

One advantage is that a reliable device-type authentication is provided without involving tedious device-type log-in procedures. Signatures as proposed here are also easily incorporated in present header structures.

BRIEF DESCRIPTION OF THE DRAWINGS

The invention, together with further objects and advantages thereof, may best be understood by making reference to the following description taken together with the accompanying drawings, in which.

DETAILED DESCRIPTION

In order to further illustrate the problems with prior-art solutions, this description will start with a short review of different DRM-techniques available today. Thereafter, the solution will be illustrated by a number of examples of example, non-limiting embodiments.

Figure 1:
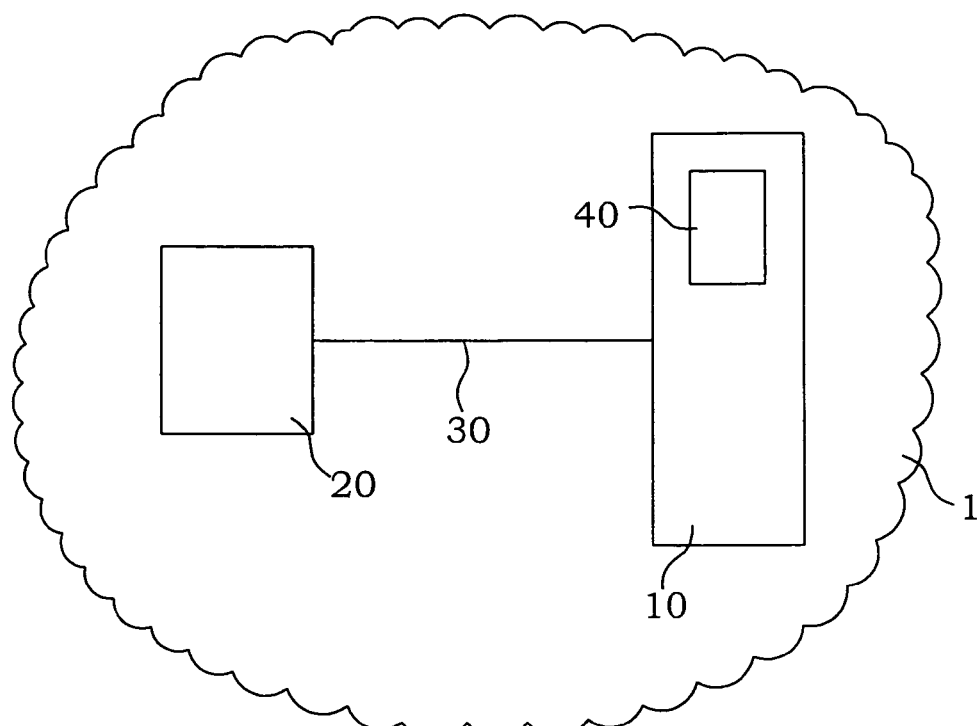
FIG. 1 is an illustration of a general communication system, where a server provides a terminal with media objects.

FIG. 1 illustrates a general communication system 1. A first device, in this illustration a server 10 acting as a content provider is connected by a permanently or temporarily established connection 30 to a second device, a terminal 20. In this example, a user of the terminal 20 would like to download a media object 40 at the server 10. In order to do this, a HTP GET message is sent from the terminal 20 to the server 10, and if the server 10 accepts the conditions associated with the received information, the media object 40 can be returned.

Figure 2A:
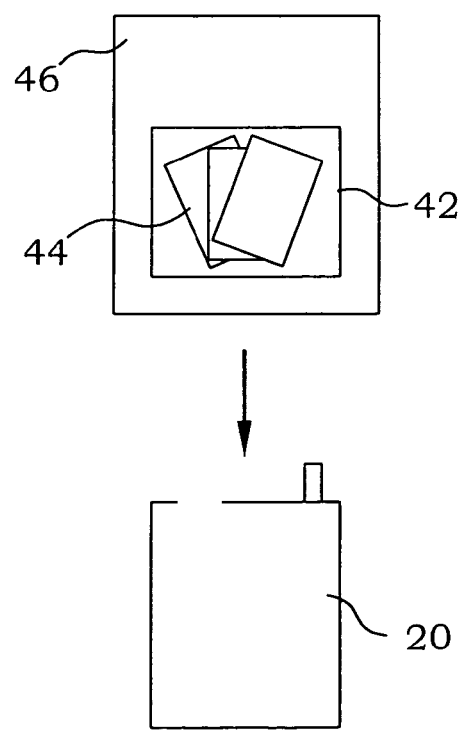
FIG. 2a is an illustration of a first DRM concept.
Figure 2B:
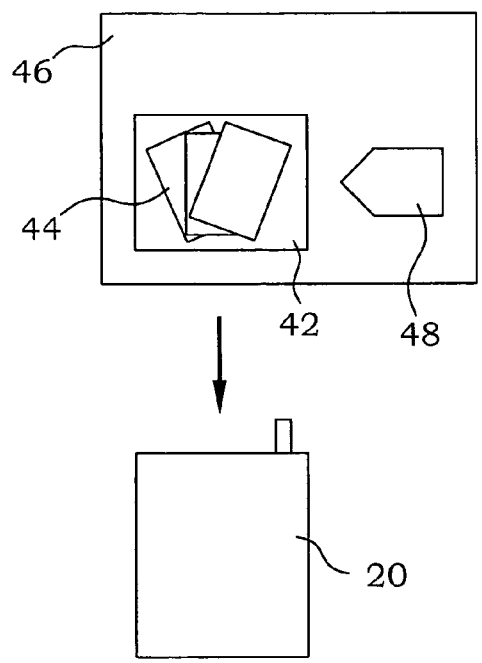
FIG. 2b is an illustration of a second DRM concept.
Figure 2C:
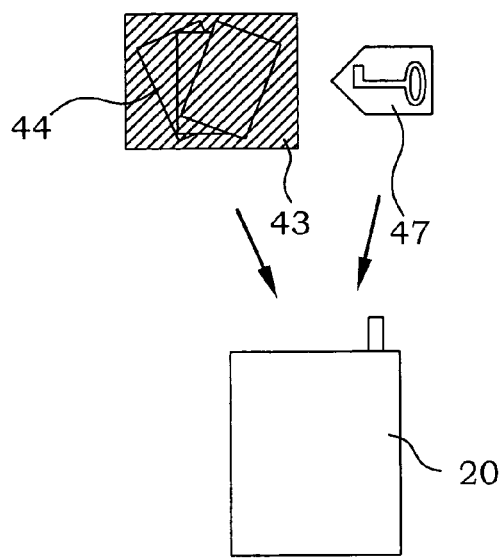
FIG. 2c is an illustration of a third DRM concept.

In the OMA proposal for DRM specifications, there are three different DRM levels, schematically illustrated in FIGS. 2a-c. DRM enables content providers to define rules or rights for how the media object should be used. It is possible to associate different rights with a single media object. Different rights may have different prices. A content provider can grant a user the rights to preview media objects for free and charge the user only for the full usage rights. Since the value lies in the rights to use the media object itself, DRM makes it possible to sell the rights to use the media object, rather than selling the media object itself.

A special case is first illustrated in FIG. 2a, a "forward-lock". A DRM message 46 comprising a media object 42 having a certain content 44 is WAP downloaded from a content provider to a consuming device 20. Here, a separate rights object is not present. Instead, the rights are combined with the media object 42 itself, giving a set of default rights to the media object 42. Since different consumers often have different requests for the rights of the delivered media object, this case is difficult to employ in many cases.

In FIG. 2b, a combined delivery is illustrated. Here, the content 44 of the media object 42 and the associated rights 48 are delivered within one and the same DRM message 46 downloaded by the terminal 20. This solution is quite simple since it is easy to maintain the connection between the rights 48 and the actual content 44.

In FIG. 2c, a separate delivery scheme is illustrated. A media object 43 is locked for any unauthorized use and the content 44 can only be available for a user if associated rights 47 are available. The associated rights 47 thus operate as a key for the locked media object 43. In order to increase the security, the locked media object 43 and the rights 47 are sent separately to the terminal. The media object 43 is downloaded by the terminal 20. The rights can then by unconfirmed push be supplied to the terminal 20. In the terminal 20, the media object 43 and the rights 47 are associated to each other and the content 44 of the media object 43 can be made available for a user according to the rules of the rights 47.

The WAP download DRM scope solves two main problems. First, a forwarding of media objects is prohibited. Secondly, it is possible to define certain rules for the usage of the media object, which means that all kinds of preview, limited number of accesses, limited validity time etc. can be solved by one and the same concept.

However, as mentioned in the summary, the large problem is that the entire DRM concept is based on an assumption that the terminal really follows the DRM commitments. Before the content with DRM is sent to the terminal, the server holding the media object will receive information about the capability of the terminal. This is done using e.g. HTTP headers as Accept, User Agent or UAProf. Any terminal may signal to the server that it claims to support DRM, by just sending the capabilities according to the DRM specification. However, the server does not know if what is claimed is really true. This means that it might be the case that content providers, without knowing it, sends valuable content to terminals that will not inflict DRM rules. These terminals can then easily break the DRM protection and use the content according to their own judgement.

As stated above, the solution of the problems is to introduce a signature of the header information itself. Signatures are used in many different applications to verify the authenticity of different data objects, e.g. texts, executables or media files. In this case, it is not the actual data content that is protected by a signature, but instead the header information. The signature can thereby be used to verify the correctness of the header information. This concept could be used in many different applications, but is particularly well suited to authenticate header information being related to device-type associated commitments. A typical example of such commitment is the commitment to follow a certain DRM scheme.

If a terminal sends a HTTP header containing the portion "application/vnd.oma.drm.message", this will implicitly tell the receiving server that the terminal accepts to follow the OMA DRM regulations. Similarly, a HTTP header comprising "User-Agent: SEM4.6" states that the terminal is based on the Sony-Ericsson-Mobile 4.6 software. Any receiving server can easily find out that such a software supports DRM, and the User-Agent header is therefore also implicitly a commitment to follow DRM. Furthermore, also a HTTP header "UAProf: www.sem.com/phones/t68" is an implicit commitment, since it can be concluded what the T68 mobile phone is stated to support.

Headers that tell what capability the device supports are signed by the terminal. The server can then validate the signature and make sure that the sender is a trusted device. The actual processes of creating signatures may be performed according to principles of prior art. However, signatures of header information have not yet been used.

In the examples of headers above, HTTP was used as a model communication protocol. However, also other protocols using headers comprising device-related information can be used, such as e.g. SMTP.

First header information defines e.g. a device-type associated commitment. A second header information gives the signature thereof. This first and second header information can be provided in separate headers or can be combined into one and the same header. For instance, instead of introducing a header "User-Agent-Signature", the header User-Agent could be modified to incorporate also the signature.

In most cases, it is convenient to include both the first and second header information in one and the same actual message. It would, however, also be feasible to send the first header information in one message and the second header information in another message, preferably the subsequent one. The two messages could then be viewed as one combined message, split into two transmissions. Such split communication of the header information may increase the security, but on the other hand, there has to be additional means for associating these part messages at the receiving end. In the disclosure the term "message" is interpreted as comprising a single message as well as a combined message as discussed earlier in this paragraph.

Figure 3:
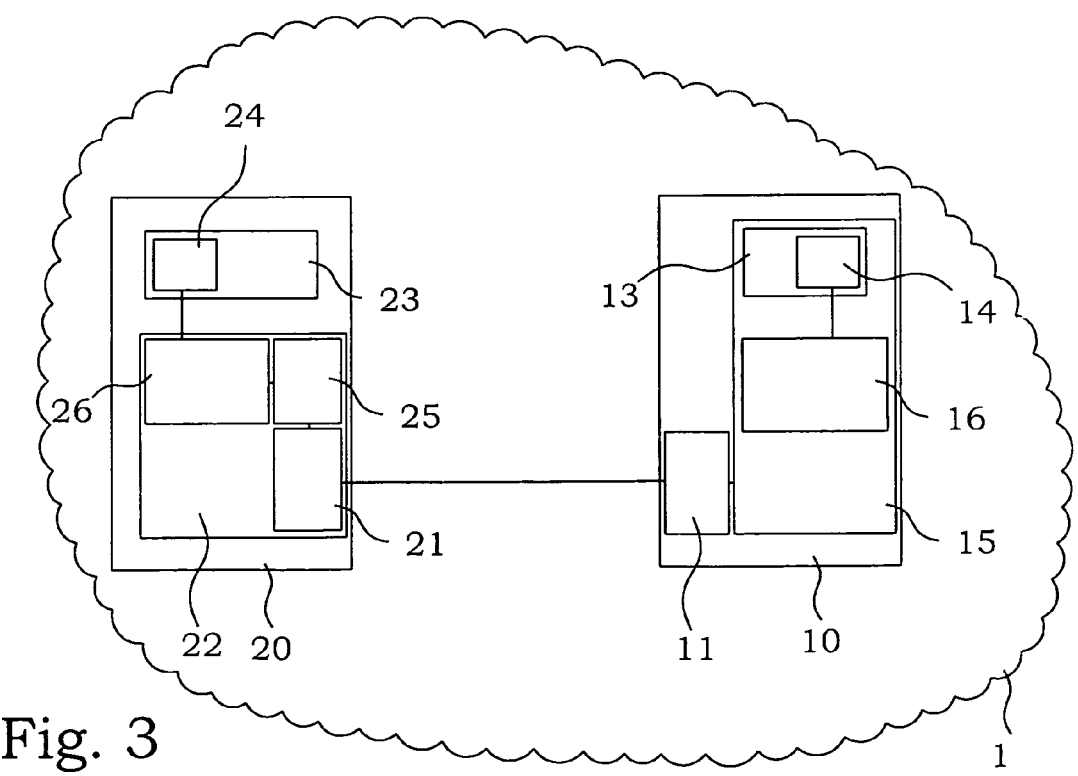
FIG. 3 is a block diagram of an example, non-limiting embodiment of a communication system.

Below, a few example implementations are described. In FIG. 3, a communication system 1 is illustrated. A terminal 20 comprises a download means 22 using a download agent SEM4.6 and a tamper-resistant storage 23 for a shared secret 24. The shared secret 24 is in this embodiment a secret data string unique for terminals having a SEM4.6 download agent. It is not possible to read out the content of this tamper-resistant storage 23 except by well specified routines by the download means 22. The download means 22 in turn comprises communication means 21, responsible for the communication with other parties in the communication system 1, and a header provider 25, which creates the headers of the messages sent by the communication means 21. According to one embodiment, the download means 22 also comprises a signature generator 26.

The user of the terminal 20 wants to download a media object from a content provider having a server 10. The terminal 20 prepares an HTTP GET message for the intended media object, and the header provider 25 creates a header "User-Agent: SEM4.6". The download means 22 reads out the shared secret 24 content of the storage 23, adds data from the HTTP User-Agent header and runs it through the signature generator 26. The signature generator is in this embodiment a keyed message digest, e.g. MD5. The data added from the HTTP header is in this particular example the text string "SEM4.6". The MD5 is a one-way mathematical function that produces a 128-bit unique representation of some data. The output from the computation in the signature generator 26 constitutes the signature of the header and is added in e.g. in a new header "User-Agent-Signature: 897y65ghdra48" by the header provider 25. In this embodiment, the header provider 25 is responsible for creating both the original header information and the header information comprising the signature thereof.

The HTTP GET message, now with a signed header, is sent to the server 10. The server 10 comprises in this embodiment a shared secret 14—the same shared secret 24 as the terminal 20 has. Also this shared secret 14 is stored in a tamper-resistantly manner in a storage 13. A communication interface or other means 11 receives the message. The server 10 notices the User-Agent header and relates it to a case where an authentication of the header information is needed. The header information, comprising the User-Agent part and the signature part is forwarded to authentication circuitry or other means 15. The storage 13 is comprised in or connected to the authentication circuitry or other means 15. A signature generator 16 in the authentication circuitry or other means 15 reads the shared secret 14 associated with this User Agent from the storage 13. To this shared secret, data from the HTTP header is added, the same data as the signature generator 26 of the terminal 20 added. The signature generator 16 runs this data through a MD5 routine to achieve an independent result. If the calculated output from the MD5 has the same value as the signature of the HTTP header, the original HTTP User-Agent header can be trusted.

The server now maps the verified User-Agent to see what DRM classes the terminal supports and replies with the requested media object according to a suitable DRM class.

Anyone skilled in the art realizes that the different means in the terminal and servers are functional means rather than physical devices. The different part means of the terminal and server can be provided as software, hardware or a mixture there between. Furthermore, they can be implemented as units as well as distributed means. Moreover, it is also understood by the skilled in the art that the different means can be separate or integrated with each other. The block structures in the figures of the present disclosure are therefore only intended for facilitate the understanding of the functions of the means, rather than a physical block structure.

In the above embodiment, a mixture between the shared secret and the HTTP header information was used as the input for the MD5 procedure. However, also other inputs are possible. The HTTP header information could be totally left out, so that the signature is based only on the shared secret. However, the so produced signatures could be possible to tap for an intruder and used for his own purposes.

Above, the communication is described between a terminal and a server. Such a communication is of course also possible to perform between any devices in a communication system. However, in a typical case, a server is the part providing the media object and a terminal, such as a computer, mobile phone, audio player etc, is the receiving party.

The signature creation could also be based on other information being known by both the terminal and the server. For instance, the time of the day could be mixed with the shared secret to produce the signature. This means that a signature, sent together with a header at one occasion, becomes invalid at another time. Similarly, the date could also be used to further provide an apparent randomness. Also other header information, not particularly connected to the User-Agent could be used for such purposes. In all these cases, the signature is based on knowledge that is common to both the terminal and the server when the server has received the header.

Figure 4:
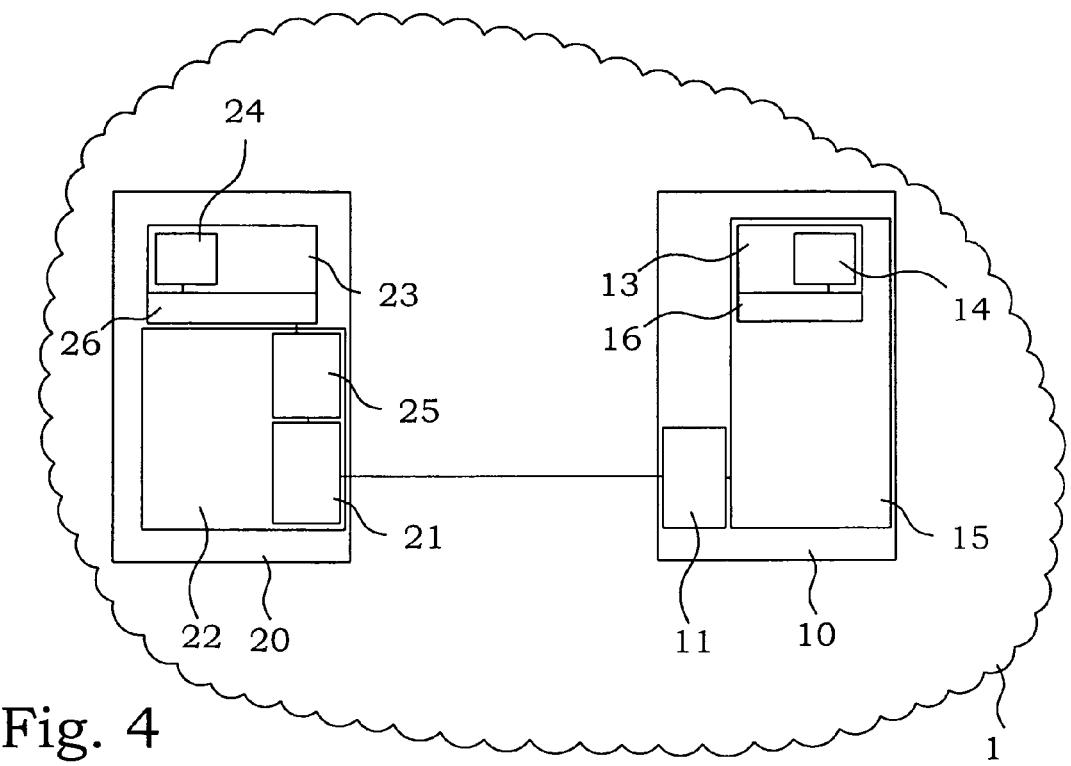
FIG. 4 is a block diagram of another example, non-limiting embodiment of a communication system.

Another embodiment is illustrated in FIG. 4. Here, the storage 23 and the signature generator 26 are integrated. The shared secret 24 comprises in this embodiment a definition of an algorithm, according to which the signature is created. In one typical example, the header information (SEM4.6) and the time of the day are entered into the signature generator 26. The signature generator 26 reads the secret algorithm definition from the storage 23 and performs the signature creation accordingly.

At the server side, the verification of the signature is performed in an analogue manner. The input data, i.e. the header information and time is entered into the signature generator 16, which is dependent on algorithm information from the storage 13. A comparison between the result and the header signature verifies the authenticity.

Of course, a combination of the embodiments of FIG. 3 and FIG. 4 is also feasible, where the storages 13, 23 comprises both a shared data secret and a shared algorithm definition secret.

As anyone skilled in the art realizes, the reliability of the signature relies on the secrecy of the shared secret. If the shared secret and the signature algorithm are known, any intruder will be able to simulate also a correct signature. In the case of the terminal, the shared secret is provided by the manufacturer at the manufacturing of the terminal, and there are means for prohibiting unauthorized retrieval of this information. Since it is in the interest of the manufacturer to really keep this secret a secret, there is presumably a strong protection at the manufacturer side.

However, if the procedure is going to operate according to the embodiments of FIG. 3 and FIG. 4, the shared secret also has to be present in the server. Since there are a huge number of actors, content providers etc., that should be using this concept, the shared secret has to be distributed to each one of the servers. This means that important information has to be spread over a large number of devices and to a large number of actors. If any of the involved servers has an insufficient protection of the shared secret, or if any of the involved actors has deficient routines handling such secrets, the integrity of the signature protection may be destroyed.

Figure 5:
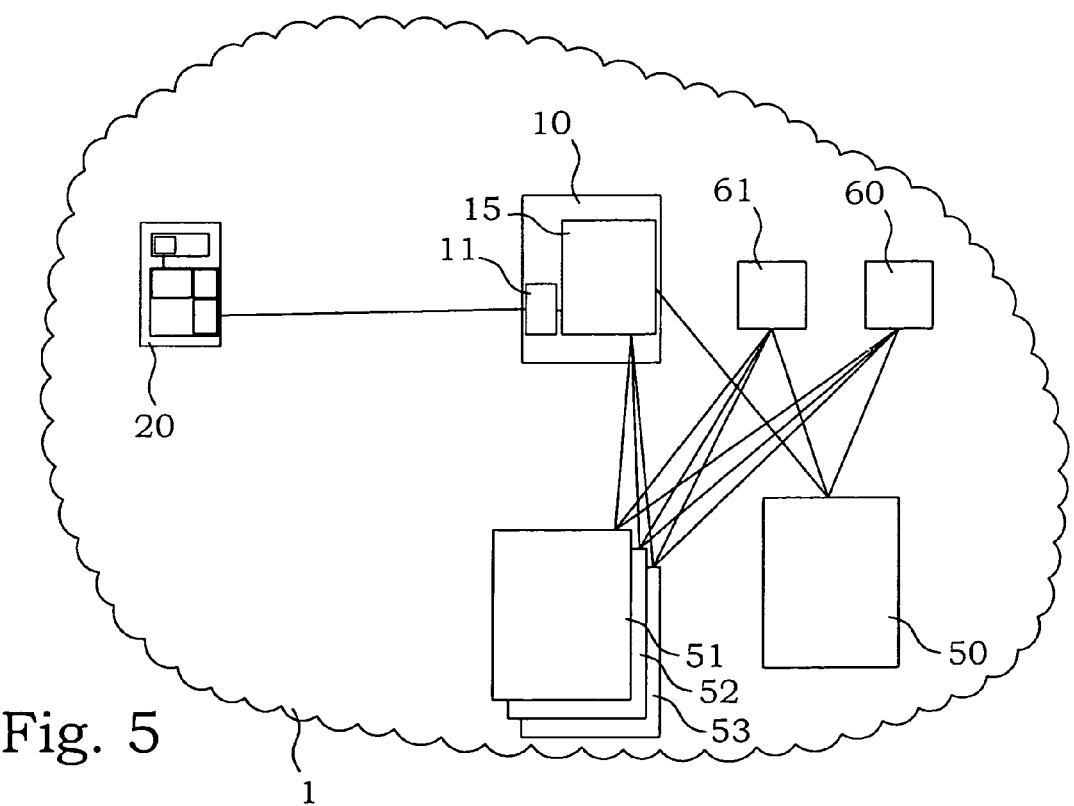
FIG. 5 is a block diagram of yet another example, non-limiting embodiment of a communication system.

In FIG. 5, illustrates another embodiment, which reduces the risk of distributing the shared secret to many parties. The terminal side is sinilar as in FIG. 3. However, the authentication means 15 of the server 10 does not comprise any shared secret itself. Instead, in the present embodiment, the authentication means 15 comprises means for forwarding an authentication request to a third party, a safe server 50. The authentication means 15 reads e.g. User-Agent header information and looks up a safe server 50 providing authentication services for this user agent.

The safe server 50 comprises hardware and routines for handling shared secrets that are carefully controlled. For instance, a manufacturer of the terminal 20 may very well provide such a safe server 50 and guarantee that the shared secrets are provided tamper-resistently. The authentication request from the authentication means 15 comprises the header information received by the server 10, in particular any parts that are used in the creation of the signature and the signature itself. The safe server 50 receives this information and performs a signature verification procedure that is tamper resistant. The signature verification uses the knowledge of the shared secret. If the signature is verified, a reply stating that the header information is authentic is returned to the authentication means 15. Otherwise, a reply noticing a false signature is returned. If the safe server 50 provides a positive verification, the header information is accepted as authentic by the server 10, and the media object can safely be distributed according to e.g. suitable DRM routines.

The server 10 is preferably additionally connectable to different safe servers 51-53, where each server guarantees the shared secret of one or a few User Agents, application definitions, or device-types. From the original header information, it is concluded which one of the safe servers 50-53 that should be contacted for requesting an authenticity verification. Similarly, other servers 60, 61 belonging to other content providers can be connectable to the same safe servers 50-53.

In this configuration, it is sufficient if the shared secret is available at one or a few very trustable servers. The secrecy can then be guaranteed to a completely different level. This concept is based on a trusted relationship between the safe server and the content provider. The content provider is the party taking the risk of distributing media object. However, an operator of a safe server, e.g. a terminal manufacturer, guarantees that the secret is unreachable for any unauthorized use.

Figure 6:
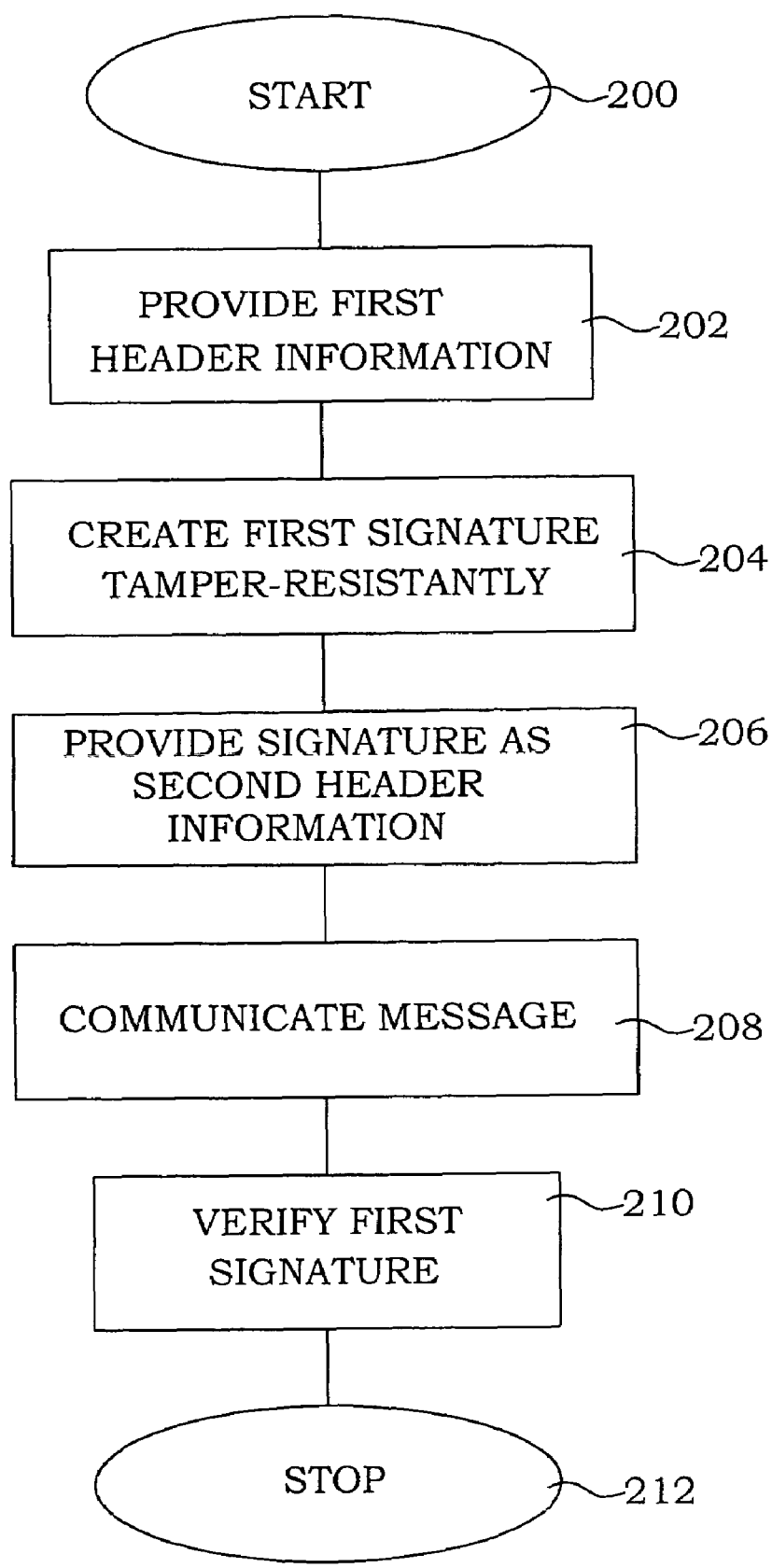
FIG. 6 is a flow diagram illustrating the major steps of an example, non-limiting embodiment of a methodn.

FIG. 6 illustrates a flow diagram. The procedure starts in step 200. In step 202, a first header information of a communication message is provided in a first device. Preferably, the first header information comprises information being related with a device-type associated commitment. In step 204, a first signature is tamper-resistantly created in the first device. The signature creation is based on at least tamper-resistant information that is associated with at least a part of the first header information. The signature is provided as a second header information of the communication message in step 206. In step 208, the message is communicated to another device of a communication system to which the first device is connected. Finally, in step 210, the first header information is authenticated by verifying said first signature after the message is received in the second device. The procedure ends in step 212.

Further preferred embodiments are easily deducible from the previous description.

It will be understood by those skilled in the art that various modifications and changes may be made to the present invention without departure from the scope thereof, which is defined by the appended claims.

The invention claimed is:

1. Method for device-type authentication in a communication system, comprising the steps of:
   providing, in a first device connected to said communication system, first header information of a communication message;
   said first header information being related with a device-type associated commitment;
   said device-type associated commitment being a commitment for devices of a particular device-type regarding what capability the devices support;
   tamper-resistantly creating a first signature in said first device based on at least tamper-resistant device-type specific information of said first device;
   providing, in said first device, second header information of said communication message comprising said signature;
   communicating said communication message to a second device connected to said communication system; and
   authenticating said first header information by verifying said first signature after said communicating step,
   wherein said step of authenticating in turn comprises:
   determining, in said second device, a device-type of said first device based on said first header information;
   creating a second signature in said second device based on at least tamper-resistant information associated with said determined device-type; and
   accepting said determined device-type as authentic if said first and second signatures agree.

2. Method according to claim 1, wherein said communication system is based on a transfer protocol selected from the group: of HyperText Transfer Protocol and Simple Mail Transfer Protocol.

3. Method according to claim 2, wherein said device-type associated commitment is a commitment to follow Digital Rights Management compliance.

4. Method according to claim 1, wherein said first device is a user terminal.

5. Method according to claim 1, wherein said second device is a server.

6. Method according to claim 1, wherein said device-type specific information comprises a definition of an algorithm according to which said signature is to be created.

7. Method according to claim 1, wherein said device-type specific information comprises a data string being unique for each particular device type.

8. Method according to claim 1, wherein said step of creating a signature is additionally based on at least one item in the group of: time, date and header information.

9. Method for device-type authentication in a communication system, comprising the steps of:
   providing, in a first device connected to said communication system, first header information of a communication message;
   said first header information being related with a device-type associated commitment;
   said device-type associated commitment being a commitment for devices of a particular device-type regarding what capability the devices support;
   tamper-resistantly creating a first signature in said first device based on at least tamper-resistant device-type specific information of said first device;
   providing, in said first device, second header information of said communication message comprising said signature;
   communicating said communication message to a second device connected to said communication system; and
   authenticating said first header information by verifying said first signature after said communicating step,
   wherein said step of authenticating in turn comprises:
   forwarding information about said first header information and said first signature from said second device to a third device connected to said communication system;
   requesting a verification of the authenticity of said first header information by said third device; and accepting said first header information as authentic if said third device provides a positive verification.

10. Method according to claim 9, wherein said third device is associated with a manufacturer of said first device.

11. Communication device connectable to a communication system, comprising:
a communication interface for receiving a communication message from a sending device connected to said communication system;
said communication message comprising first header information being related with a device-type associated commitment;
said device-type associated commitment being a commitment for devices of a particular device-type regarding what capability the devices support;
said communication message further comprising second header information in turn comprising a first signature; and
authenticating circuitry arranged to verify said first signature,
wherein said authenticating circuitry comprises:
circuitry arranged to determine a device-type of said sending device based on said first header information;
storage for storing device-type specific information of communication devices;
a signature generator arranged to retrieve device-type specific information corresponding to said determined device-type;
said signature generator being further arranged to create a second signature based on said retrieved device-type specific information; and
circuitry arranged to accept said determined device-type as authentic if said first and second signatures agree.

12. Communication device according to claim 11, wherein said communication interface is arranged to support a transfer protocol selected from the group: of HyperText Transfer Protocol and Simple Mail Transfer Protocol.

13. Communication device according to claim 12, further comprising Digital Rights Management means, whereby said device-type associated commitment is a commitment to follow Digital Rights Management compliance.

14. Communication device according to claim 11, wherein said communication device is a server.

15. Communication device connectable to a communication system, comprising:
a communication interface for receiving a communication message from a sending device connected to said communication system;
said communication message comprising first header information being related with a device-type associated commitment;
said device-type associated commitment being a commitment for devices of a particular device-type regarding what capability the devices support;
said communication message further comprising second header information in turn comprising a first signature; and
authenticating circuitry arranged to verify said first signature,
wherein said authenticating circuitry is arranged to:
forward information about said first header information and said first signature to a further device connected to said communication system;
request a verification of the authenticity of said first header information by said further device; and
accept said first header information as authentic if said further device provides a positive verification.

* * * * *